(12) United States Patent
Liu et al.

(10) Patent No.: US 12,265,298 B2
(45) Date of Patent: Apr. 1, 2025

(54) BACKLIGHT MODULE AND DISPLAY DEVICE

(71) Applicant: WUHAN CHINA STAR OPTOELECTRONICS TECHNOLOGY CO., LTD., Hubei (CN)

(72) Inventors: Guangkun Liu, Hubei (CN); Fancheng Liu, Hubei (CN)

(73) Assignee: WUHAN CHINA STAR OPTOELECTRONICS TECHNOLOGY CO., LTD., Hubei (CN)

( * ) Notice: Subject to any disclaimer, the term of this patent is extended or adjusted under 35 U.S.C. 154(b) by 0 days.

(21) Appl. No.: 17/758,971

(22) PCT Filed: Jun. 30, 2022

(86) PCT No.: PCT/CN2022/102610
§ 371 (c)(1),
(2) Date: Jul. 17, 2022

(87) PCT Pub. No.: WO2023/236283
PCT Pub. Date: Dec. 14, 2023

(65) Prior Publication Data
US 2024/0176186 A1 May 30, 2024

(30) Foreign Application Priority Data
Jun. 7, 2022 (CN) .......................... 202210642027.5

(51) Int. Cl.
*G02F 1/13357* (2006.01)
*G02F 1/1335* (2006.01)

(52) U.S. Cl.
CPC .. *G02F 1/133606* (2013.01); *G02F 1/133603* (2013.01); *G02F 1/133612* (2021.01)

(58) Field of Classification Search
CPC ......... G02F 1/133606; G02F 1/133603; G02F 1/133612
See application file for complete search history.

(56) References Cited

U.S. PATENT DOCUMENTS

2010/0321341 A1 12/2010 Cho et al.
2011/0018815 A1 1/2011 Han et al.
(Continued)

FOREIGN PATENT DOCUMENTS

CN 201242737 Y 5/2009
CN 107479281 A 12/2017
(Continued)

OTHER PUBLICATIONS

International Search Report in International application No. PCT/CN2022/102610, mailed on Nov. 25, 2022.
(Continued)

*Primary Examiner* — Mariceli Santiago
(74) *Attorney, Agent, or Firm* — PV IP PC; Wei Te Chung

(57) ABSTRACT

A backlight module and a display device are provided. The backlight module includes a light-emitting substrate. The light-emitting substrate includes a substrate, an array layer disposed on the substrate and including a plurality of photosensitive units and switch units, and a plurality of light-emitting chips disposed on a side of the array layer away from the substrate and staggered from the photosensitive units. The light-emitting chips are electrically connected to at least one of the switch units.

20 Claims, 4 Drawing Sheets

(56) References Cited

U.S. PATENT DOCUMENTS

| | | |
|---|---|---|
| 2018/0053032 A1 | 2/2018 | Ding et al. |
| 2020/0201117 A1* | 6/2020 | Zheng ............... G02B 5/0205 |
| 2021/0366990 A1 | 11/2021 | Tang |
| 2022/0100982 A1 | 3/2022 | Yao et al. |

FOREIGN PATENT DOCUMENTS

| | | |
|---|---|---|
| CN | 108983470 A | 12/2018 |
| CN | 109100886 A | 12/2018 |
| CN | 109239980 A | 1/2019 |
| CN | 109375402 A | 2/2019 |
| CN | 109407406 A | 3/2019 |
| CN | 109521605 A | 3/2019 |
| CN | 109686808 A | 4/2019 |
| CN | 110416277 A | 11/2019 |
| CN | 111025718 A | 4/2020 |
| CN | 111061090 A | 4/2020 |
| CN | 111221165 A | 6/2020 |
| CN | 111694179 A | 9/2020 |
| CN | 111968994 A | 11/2020 |
| CN | 111971616 A | 11/2020 |
| CN | 112259556 A | 1/2021 |
| CN | 112817173 A | 5/2021 |
| CN | 112928134 A | 6/2021 |
| CN | 114188358 A | 3/2022 |
| JP | S62208118 A | 9/1987 |
| WO | 2022077716 A1 | 4/2022 |

OTHER PUBLICATIONS

Written Opinion of the International Search Authority in International application No. PCT/CN2022/102610, mailed on Nov. 25, 2022.

Chinese Office Action issued in corresponding Chinese Patent Application No. 202210642027.5 dated Apr. 27, 2023, pp. 1-10.

\* cited by examiner

BACKLIGHT MODULE AND DISPLAY DEVICE

BACKGROUND OF INVENTION

1. Field of Invention

The present application relates to a technical field of displays, and particularly to a backlight module and a display device.

2. Related Art

Currently, infrared remote control technologies have been widely used in a field of displays. For example, infrared laser pointers are used to turn pages of presentations displayed on display screens. However, traditional infrared remote control technologies require infrared transmitters to be aligned with infrared receivers, otherwise infrared remote control cannot be realized.

Therefore, how to solve the drawback of strong directionality of traditional infrared remote control technologies becomes an imperative issue.

SUMMARY OF INVENTION

An object of the present application is to provide a display backlight module and a display device that help to solve the problem of strong directionality of traditional infrared remote control technologies.

In order to achieve the above-mentioned object, the present application provides a backlight module, including a substrate, an array layer disposed on the substrate and including a plurality of photosensitive units and switch units, and a plurality of light-emitting chips disposed on a side of the array layer away from the substrate and staggered from the photosensitive units, wherein the light-emitting chips are electrically connected to at least one of the switch units.

In the backlight module of some embodiments, the photosensitive units are configured to sense light of a first wavelength, and the light-emitting substrate further includes a selective light transmission layer disposed on the side of the array layer away from the substrate and between the light-emitting chips, wherein the selective light transmission layer overlaps the photosensitive unit, allows for transmission of light of a second wavelength, and blocks light other than the light of the second wavelength, wherein the second wavelength is in a band corresponding to the first wavelength.

In the backlight module of some embodiments, the light of the second wavelength is infrared light, and the light of the first wavelength comprises ultraviolet light, visible light, and infrared light.

In the backlight module of some embodiments, the selective light transmission layer is an ink layer.

In the backlight module of some embodiments, the ink layer is a white ink layer or a black ink layer.

In the backlight module of some embodiments, a thickness of the selective light transmission layer is greater than or equal to 10 microns and less than or equal to 100 microns.

In the backlight module of some embodiments, at least some of the photosensitive units are disposed between adjacent ones of the light-emitting chips, and/or at least some of the light-emitting chips are disposed between adjacent ones of the photosensitive units.

In the backlight module of some embodiments, the array layer further includes a plurality of film layers disposed in a stacked manner, and a via hole extending through at least part of the film layers in a thickness direction of the light-emitting substrate. Each of the photosensitive units includes a photosensitive layer, and at least part of the photosensitive layer is disposed at a bottom of the via hole.

In the backlight module of some embodiments, the photosensitive layer is located in the via hole and extends to a surface of one of the film layers located furthest from the substrate relative to others of the film layers.

In the backlight module of some embodiments, each of the switch units comprises a first active layer, and a thickness of the photosensitive layer is greater than that of the first active layer.

In the backlight module of some embodiments, a ratio of the thickness of the photosensitive layer to the thickness of the first active layer is greater than or equal to 1.5 and less than or equal to 10.

In the backlight module of some embodiments, the thickness of the photosensitive layer is greater than or equal to 1000 angstroms and less than or equal to 3500 angstroms.

In the backlight module of some embodiments, the array layer further includes a light-transmissive protective layer, wherein at least part of the light-transmissive protective layer is arranged in the via hole and located on the photosensitive layer.

In the backlight module of some embodiments, the transmittance of the light-transmissive protective layer to light is greater than or equal to 80%.

In the backlight module of some embodiments, a fabrication material of the light-transmissive protective layer is indium tin oxide.

In the backlight module of some embodiments, the array layer further includes a signal reading switch electrically connected to the photosensitive unit.

In the backlight module of some embodiments, the signal reading switch includes a second active layer comprising a channel, a heavily doped source portion, and a heavily doped drain portion, wherein the heavily doped source portion and the heavily doped drain portion are located at opposite sides of the channel, respectively, and a conductive electrode in contact with one of the heavily doped source portion or the heavily doped drain portion. The via hole is disposed corresponding to the other one of the heavily doped source portion or the heavily doped drain portion. The photosensitive layer is in contact with the other one of the heavily doped source portion or the heavily doped drain portion through the via hole.

In the backlight module of some embodiments, the photosensitive unit includes a photosensitive layer, and the switch unit includes a first active layer disposed in a same layer as the photosensitive layer.

In the backlight module of some embodiments, the array layer further includes a signal reading switch electrically connected to the photosensitive unit.

In the backlight module of some embodiments, the array layer further includes a reset switch electrically connected to the photosensitive unit.

In the backlight module of some embodiments, the signal reading switch includes a second active layer, and the reset switch includes a third active layer. The second active layer and the third active layer are arranged in a same layer as the first active layer. The array layer further includes a bridging line connected to the photosensitive layer, the third active layer, and the gate of the signal reading switch.

In the backlight module of some embodiments, the backlight module further includes an optical assembly located on a light exit side of the light-emitting substrate and includes at least one optical sheet, and transmittance of the one optical sheet to the light of the second wavelength is greater than or equal to 50% and less than or equal to 90%.

In the backlight module of some embodiments, the optical assembly includes a plurality of the optical sheets, and transmittance of the optical assembly to the light of the second wavelength is greater than or equal to 20% and less than or equal to 80%.

A display device includes the above-mentioned backlight module; and a liquid crystal display panel disposed on a light exit side of the backlight module.

The present application has advantageous effects as follows: by integrating the photosensitive units in the array layer of the backlight module, the light for remote control can be incident on the display device from any angle, pass through the liquid crystal display panel and enter the backlight module to be received by the photosensitive units in the array layer of the backlight module, so that the photosensitive units convert the received light into electrical signals, and the backlight module transmits the electrical signals to the liquid crystal display panel, thereby achieving the remote control of the display device at any position.

DESCRIPTION OF PREFERRED EMBODIMENTS

Figure 1:
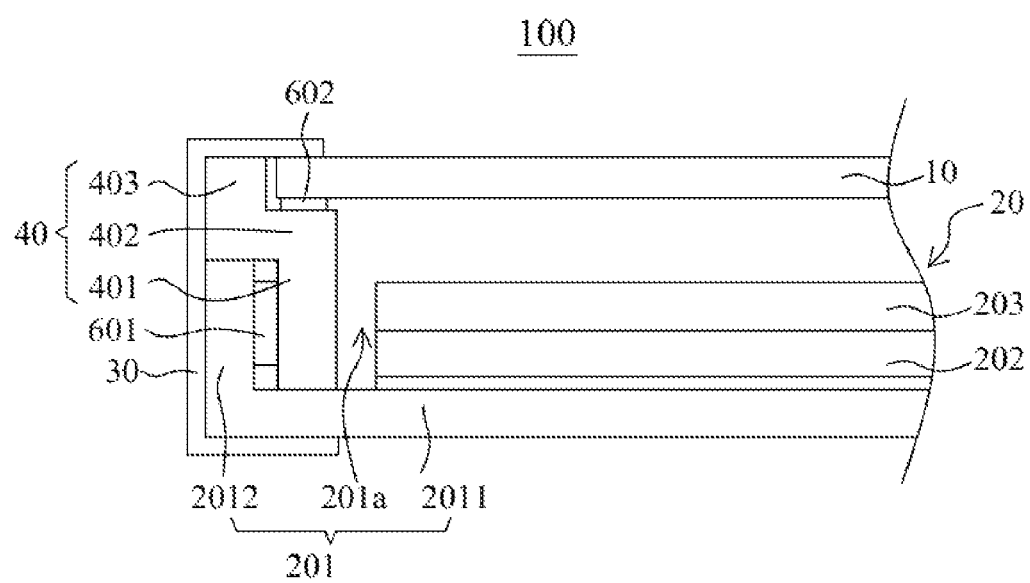
FIG. 1 is a schematic cross-sectional view of a display device according to an embodiment of the application.
Figure 2:
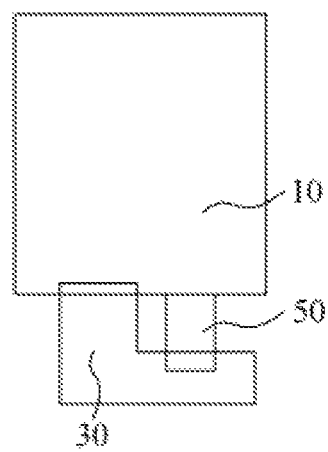
FIG. 2 is a schematic plan view of the display device of FIG. 1.

Referring to FIGS. 1 and 2, the present application provides a display device 100. The display device 100 operates with a laser pointer to achieve remote control interaction. The display device 100 includes a liquid crystal display panel 10, a backlight module 20, a first flexible printed circuit board 30, and a support member 40.

The liquid crystal display panel 10 is located on a light exit side of the backlight module 20, the first flexible printed circuit board 30 is bonded to one end of the liquid crystal display panel 10, and the backlight module 20 includes a second flexible printed circuit board 50. The second flexible printed circuit board 50 is connected to the first flexible printed circuit board 30 to achieve electrical connection between the backlight module 20 and the liquid crystal display panel 10.

The backlight module 20 includes a backplane 201, a light-emitting substrate 202, and an optical assembly 203. The back plate 201 includes a bottom plate 2011 and four first side plates 2012. The four first side plates 2012 are disposed along four edges of the bottom plate 2011, respectively. Adjacent two of the first side plates 2012 are connected. The bottom plate 2011 and the four first side plates 2012 enclose an accommodating space 201a. The light-emitting substrate 202 and the optical assembly 203 are disposed in the accommodating space 201a, and the optical assembly 203 is located on the light exit side of the light-emitting substrate 202.

The support member 40 is fixed on the back plate 201. The support member 40 includes a second side plate 401, a support plate 402, and a third side plate 403. The support plate 402 is connected between the second side plate 401 and the third side plate 403, and the support plate 402 is perpendicularly connected to the second side plate 401 and the third side plate 403. The second side plate 401 is disposed in the accommodating space 201a and correspondingly arranged in parallel with the first side plate 2012. The second side plate 401 and the first side plate 2012 are connected by a first connecting member 601. The support plate 402 is disposed on the first side plate 2012, and the liquid crystal display panel 10 is fixedly disposed on the support plate 402 through a second connecting member 602. Specifically, the first connecting member 601 and the second connecting member 602 may be adhesive layers, foam glue, or adhesive tape.

The optical assembly 203 includes a plurality of optical sheets disposed in a stacked arrangement, and the optical sheets include a diffuser plate, a diffuser sheet, a brightness enhancement film, and a reflective brightness enhancement film. The number of the diffuser sheets may be one or more. The optical assembly 203 may further include one or more color conversion films, such as quantum dot fluorescence conversion films, or the like.

Figure 3:
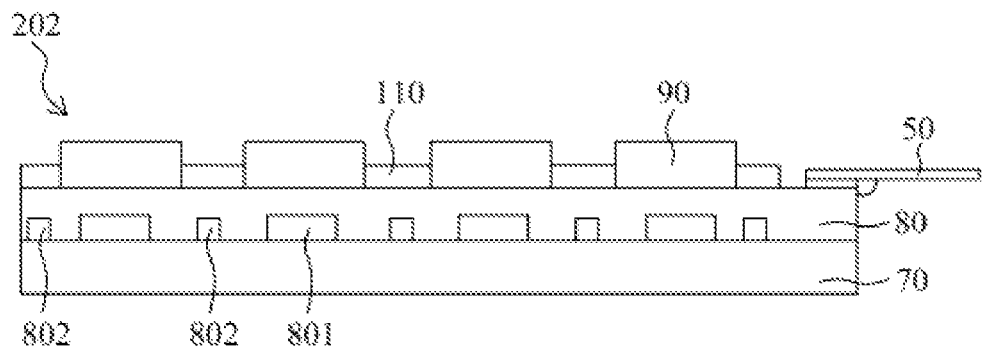
FIG. 3 is a schematic cross-sectional view of a light-emitting substrate shown in FIG. 1.
Figure 4:
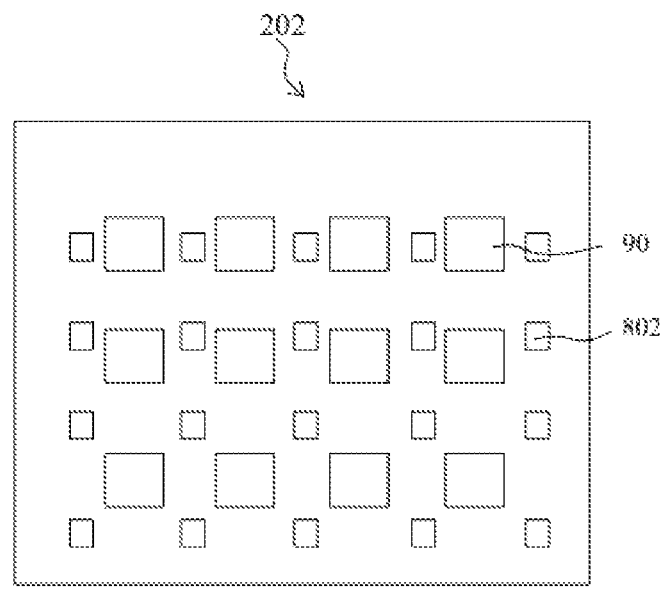
FIG. 4 is a schematic plan view of the light-emitting substrate of FIG. 3.

Referring to FIGS. 3 and 4, the second flexible printed circuit board 50 is bonded to the light-emitting substrate 202. The light-emitting substrate 202 includes a substrate 70, an array layer 80, and a plurality of light-emitting chip 90.

The substrate 70 is a glass substrate. The array layer 80 is disposed on the substrate 70, and the light-emitting chips 90 are disposed on a side of the array layer 80 away from the substrate 70.

The light-emitting chips 90 are arranged in an array in a row direction and in a column direction. The light-emitting chips 90 may include red light-emitting chips, blue light-emitting chips, and green light-emitting chips, or the light-emitting chips 90 only include blue light-emitting chips, or the light-emitting chips 90 only include white light-emitting chips. The light-emitting chips 90 are selected from one of inorganic light-emitting diodes, micro light-emitting diodes, or sub-millimeter light-emitting diodes.

It should be noted that when the light-emitting chips 90 only include blue light-emitting chips, the light-emitting substrate 202 may further include a fluorescence conversion film or a quantum dot conversion film. The optical assembly 203 may also include a quantum dot conversion film.

The array layer 80 includes a plurality of switch units 801 and photosensitive units 802 arranged at intervals. The light-emitting chips 90 and the photosensitive units 802 are staggered from each other. The light-emitting chips 90 are electrically connected to at least one of the switch units 801, so that the photosensitive units 802 can receive light to achieve a photosensitive function while the photosensitive units 802 are integrated into the light-emitting substrate 202 of the backlight module 20.

The photosensitive units 802 are arranged in an array in the row direction and the column direction. In the row direction and the column direction, a distance between any adjacent two of the photosensitive units 802 is equal.

At least some of the photosensitive units 802 are disposed between adjacent ones of the light-emitting chips 90, and/or at least some of the light-emitting chips 90 are disposed between adjacent ones of the photosensitive units 802.

Specifically, one or more photosensitive units 802 may be disposed between adjacent two of the light-emitting chips 90, and one or more light-emitting chips 90 may be disposed between adjacent two of the photosensitive units 802.

Since a plurality of the photosensitive units 802 can be arranged in the light-emitting substrate 202, when the laser pointer remotely controls the display device 100, the light for remote control emitted by the laser pointer can enter the display device 100 from any angle. The light for remote control passes through the liquid crystal display panel 10 and the optical assembly 203 and is incident on the light-emitting substrate 202 of the backlight module 20 to be received by the photosensitive units 802 in the array layer 80 of the backlight module 20. The photosensitive units 802 convert the received light into electrical signals, and the backlight module 20 transmits the electrical signals to the liquid crystal display panel 10 through the second flexible printed circuit board 50 and the first flexible printed circuit board 30, thereby achieving the control of the display device 100 at any position.

The photosensitive unit 802 is configured to sense light of a first wavelength and is excited by receiving the light of the first wavelength, thus generating a current signal. The light of the first wavelength includes ultraviolet light, infrared light, and visible light, that is, the photosensitive unit 802 can sense light of all wavelengths.

Specifically, a wavelength band of the first wavelength is 300 nanometers to 1500 nanometers. It can be understood that the photosensitive unit 802 may also only sense ultraviolet light, or may only sense infrared light.

When the photosensitive unit 802 can sense the light of all wavelengths, in order to allow the light for remote control to be received by the photosensitive unit 802, and to prevent light other than the light for remote control from interfering with a remote control process, the light-emitting substrate 202 of the present application is further provided with a selective light transmission layer 110. The selective light transmission layer 110 transmits light of a second wavelength and blocks the light except the light of the second wavelength. The light of the second wavelength is the light for remote control, and the second wavelength is in a band corresponding to the first wavelength.

Specifically, the light of the second wavelength is infrared light, for example, infrared light of a wavelength of 800 nanometers, 850 nanometers, 900 nanometers, 940 nanometers, 1000 nanometers, or 1150 nanometers.

The selective light transmission layer 110 is disposed on the side of the array layer 80 away from the substrate 70 and is located between the light-emitting chips 90. The selective light transmission layer 110 overlaps the photosensitive unit 802, so that the light of the second wavelength passing through the selective light transmission layer 110 is received by the photosensitive unit 802, and the light other than the light of the second wavelength will not pass through the selective light transmission layer 110 and thus will not be received by the photosensitive unit 802.

The selective light transmission layer 110 is an ink layer, and a thickness of the selective light transmission layer 110 is greater than or equal to 10 microns and less than or equal to 100 microns. For example, the thickness of the selective light transmission layer 110 is 20 microns, 30 microns, 40 microns, 50 microns, 60 microns, 70 microns, or 80 microns.

The selective light transmission layer 110 is a white ink layer or a black ink layer. Specifically, the selective light transmission layer 110 is the white ink layer, so that while the light of the second wavelength is transmitted, the selective light transmission layer 110 reflects the light emitted by the light-emitting chip 90, thereby improving utilization rate of the light emitted by the light-emitting chip 90.

Transmittance of any one of a plurality of optical sheets included in the optical assembly 203 to the light of the second wavelength is greater than or equal to 50% and less than or equal to 90%. For example, the transmittance is 60%, 70%, 80%, or 90%.

Transmittance of the optical assembly 203 as a whole to the light of the second wavelength is greater than or equal to 20% and less than or equal to 80%. For example, the transmittance is 25%, 30%, 40%, 60%, 70%, or 80%.

Transmittance of the liquid crystal display panel 10 to the light of the second wavelength is greater than or equal to 20% and less than or equal to 50%. For example, the transmittance is 20%, 30%, 40%, 45%, or 48%.

It should be noted that the transmittance of the optical assembly 203 to the light of the second wavelength is calculated by a percentage of a ratio of the brightness of the light of the second wavelength after passing through the optical assembly 203 to the brightness of the light of the second wavelength before passing through the optical assembly 203. Similarly, the transmittance of the liquid crystal display panel 10 to the light of the second wavelength can be deduced by analogy, which is not repeated here.

A percentage of a ratio of the brightness corresponding to the light of the second wavelength reaching the light-emitting substrate 202 to the brightness corresponding to the light of the second wavelength incident on the display device 100 is greater than or equal to 5% and less than or equal to 15%, for example, 6%, 7%, 8%, or 10%.

Figure 5:
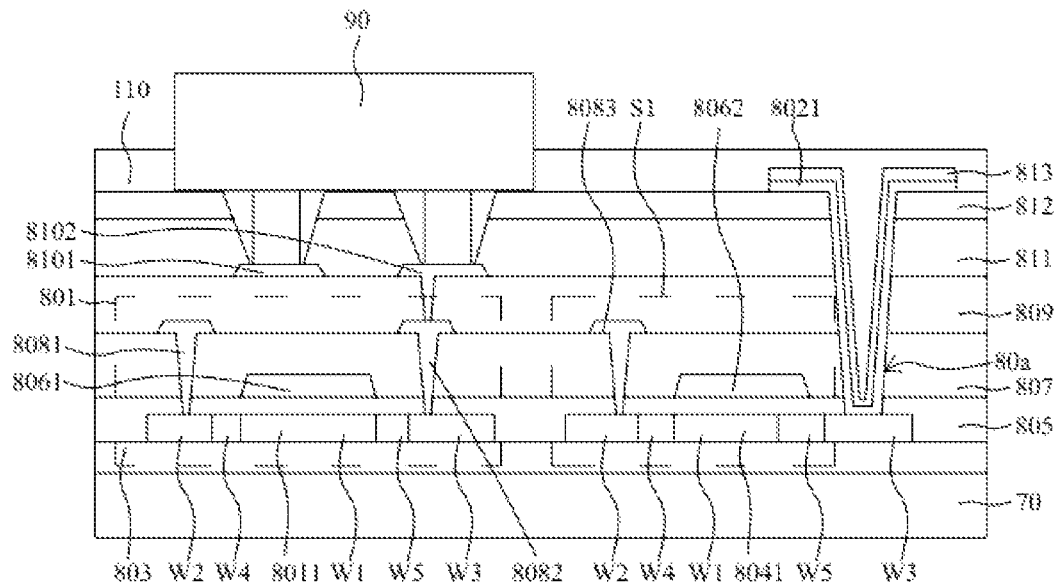
FIG. 5 is a schematic partially enlarged view of a first type of light-emitting substrate of FIG. 3.
Figure 6:
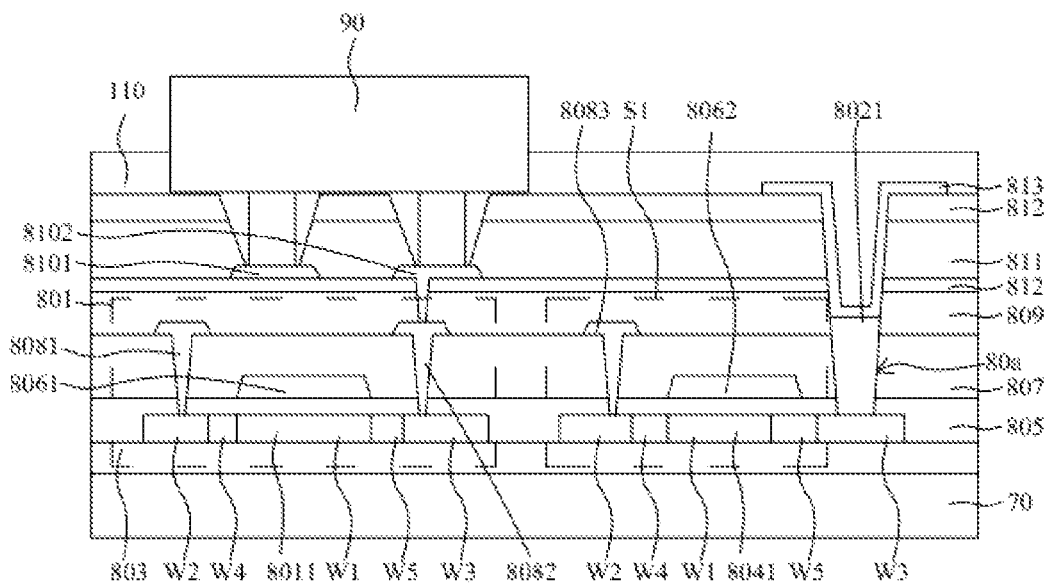
FIG. 6 is a schematic partially enlarged view of a second type of light-emitting substrate of FIG. 3.

Referring to FIGS. 5 and 6, the array layer 80 further includes a plurality of film layers disposed in a stacked manner and a via hole 80a. The via hole 80a extends through at least some of the film layers in a thickness direction of the light-emitting substrate 202. The photosensitive unit 802 includes a photosensitive layer 8021. At least part of the photosensitive layer 8021 is disposed at a bottom of the via hole 80a, so that the light of the second wavelength incident on the light-emitting substrate 202 passes through fewer layers to reach the photosensitive unit 802, which is beneficial for the photosensitive unit 802 to receive more light of the second wavelength to produce a larger current.

As shown in FIG. 5, the film layers of the array layer 80 include a buffer layer 803, a semiconductor layer, a gate insulating layer 805, a first metal layer, an interlayer insulating layer 807, a second metal layer, a first planarization layer 809, a third metal layer, a second planarization layer 811, and a passivation layer 812.

The buffer layer 803 is disposed on a surface of the substrate 70. A fabrication material of the buffer layer 803 is selected from at least one of silicon nitride or silicon oxide. A thickness of the buffer layer 803 is greater than or equal to 2000 angstroms and less than or equal to 4000 angstroms.

The semiconductor layer is disposed on the surface of the buffer layer 803 away from the substrate 70. The semiconductor layer includes a second active layer 8041 and a first active layer 8011 of the switch unit 801 arranged in a same layer. A fabrication material of the semiconductor layer is polysilicon, and a thickness of the semiconductor layer is greater than or equal to 400 angstroms and less than or equal to 600 angstroms.

Thicknesses of the first active layer 8011 and the second active layer 8041 are same. The first active layer 8011 and the second active layer 8041 each include a channel W1, a heavily doped source portion W2, a heavily doped drain portion W3, a lightly doped source portion W4, and a lightly doped drain portion W5. The channel W1 is located between the heavily doped source portion W2 and the heavily doped drain portion W3, the lightly doped source portion W4 is located between the channel W1 and the heavily doped source portion W2, and the lightly doped drain portion W5 is located between the channel W1 and the heavily doped drain portion W3.

The gate insulating layer 805 covers the semiconductor layer and the buffer layer 803. A fabrication material of the gate insulating layer 805 is selected from at least one of silicon nitride or silicon oxide. A thickness of the gate insulating layer 805 is greater than or equal to 1000 angstroms and less than or equal to 1500 angstroms.

The first metal layer is disposed on a surface of the gate insulating layer 805 away from the substrate 70. The first metal layer includes a first gate 8061 and a second gate 8062 that are spaced apart and arranged in a same layer. The first gate 8061 is disposed corresponding to the channel W1 of the first active layer 8011, and the second gate 8062 is disposed corresponding to the channel W1 of the second active layer 8041. A fabrication material of the first metal layer is selected from at least one of molybdenum, aluminum, titanium, copper, or silver. A thickness of the first metal layer is greater than or equal to 2500 angstroms and less than or equal to 5000 angstroms.

The interlayer dielectric layer 807 covers the first metal layer and the gate insulating layer 805. A fabrication material of the interlayer dielectric layer 807 is selected from at least one of silicon nitride or silicon oxide. A thickness of the interlayer dielectric layer 807 is greater than or equal to 2000 angstroms and less than or equal to 5000 angstroms.

The second metal layer is disposed on a surface of the interlayer dielectric layer 807 away from the first metal layer. The second metal layer includes a first source electrode 8081, a first drain electrode 8082, and a second source electrode 8083 which are spaced apart from one another and disposed in a same layer. A fabrication material of the second metal layer is selected from at least one of molybdenum, aluminum, titanium, copper, or silver. A thickness of the second metal layer is greater than or equal to 2500 angstroms and less than or equal to 5000 angstroms.

The first source electrode 8081 is in contact with the heavily doped source portion W2 of the first active layer 8011 through a first contact hole extending through the interlayer dielectric layer 807 and the gate insulating layer 805. The first drain electrode 8082 is in contact with the heavily doped drain portion W3 of the first active layer 8011 through a second contact hole extending through the interlayer dielectric layer 807 and the gate insulating layer 805. The switch unit 801 includes a first active layer 8011, a first gate electrode 8061, a first source electrode 8081, and a first drain electrode 8082.

The second source electrode 8083 is in contact with the heavily doped source portion W2 of the second active layer 8041 through a third contact hole extending through the interlayer dielectric layer 807 and the gate insulating layer 805. The second active layer 8041, the second gate electrode 8062, and the second source electrode 8083 are part of a signal reading switch S1.

The first planarization layer 809 covers the second metal layer and the interlayer dielectric layer 807. The first planarization layer 809 is an organic insulating layer. A thickness of the first planarization layer 809 is greater than or equal to one micron and less than or equal to 3 microns.

The third metal layer is disposed on a surface of the first planarization layer 809 away from the second metal layer. The third metal layer includes a first conductive pad 8101 and a second conductive pad 8102 arranged in a same layer and spaced apart from each other. The second conductive pad 8102 is in contact with the first drain electrode 8082 through a fourth contact hole extending through the first planarization layer 809. A fabrication material of the third metal layer is selected from at least one of molybdenum, aluminum, titanium, copper, or silver. A thickness of the third metal layer is greater than or equal to 2500 angstroms and less than or equal to 5000 angstroms.

The second planarization layer 811 and the passivation layer 812 are sequentially laminated on the third metal layer. The second planarization layer 811 is an organic insulating layer and has a thickness greater than or equal to one micron and less than or equal to three microns. The passivation layer 812 is an inorganic insulating layer and has a thickness greater than or equal to 800 angstroms and less than or equal to 1600 angstroms.

Two openings passing through the second planarization layer 811 and the passivation layer 812 expose the first conductive pad 8101 and the second conductive pad 8102, and the light-emitting chip 90 is bonded to the first conductive pad 8101 and the second conductive pad 8102.

The via hole 80a extends through the passivation layer 812, the second planarization layer 811, the first planarization layer 809, the interlayer dielectric layer 807, and the gate insulating layer 805. The via hole 80a is disposed corresponding to the heavily doped drain portion W3 of the second active layer 8041. The photosensitive layer 8021 is in contact with the heavily doped drain portion W3 of the second active layer 8041 through the via hole 80a.

It can be understood that the via hole 80a may also be disposed corresponding to the heavily doped source portion W2 of the second active layer 8041, and the second source electrode 8083 is in contact with the heavily doped drain portion W3 of the second active layer 8041 through the third contact hole extending through the interlayer dielectric layer 807 and the gate insulating layer 805.

In addition, the via hole 80a may also extend through five or less and two or more adjacent films among the passivation layer 812, the second planarization layer 811, the first planarization layer 809, the interlayer dielectric layer 807, and the gate insulating layer 805. For example, the via hole 80a may only extend through the second planarization layer 811, the first planarization layer 809, the interlayer dielectric layer 807, and the gate insulating layer 805, or the via hole 80a may only extend through the first planarization layer 809, the interlayer dielectric layer 807, and the gate insulating layer 805.

It should be noted that the photosensitive layer 8021 is in contact with the heavily doped drain portion W3 of the second active layer 8041 through the via hole 80a, so that the signal reading switch S1 is electrically connected to the photosensitive unit 802. When the current generated by the photosensitive layer 8021 receiving the light of the second wavelength satisfies the conduction condition of the signal reading switch S1, the signal reading switch S1 is turned on, and the signal reading switch S1 transmits turn-on information to the liquid crystal display panel 10, so that the control of the display device 100 can be achieved.

The photosensitive layer 8021 is disposed on the bottom of the via hole 80a and extend to a sidewall of the via hole 80a and a surface of the passivation layer 812 away from the substrate 70. That is, the photosensitive layer 8021 is disposed not only on the bottom of the via hole 80*a* and the sidewall of the via hole 80*a*, but also on the surface of one of the film layers located furthest from the substrate 70 relative to others of the film layers, which helps the photosensitive layer 8021 receive more light of the second wavelength and increases the photo-induced current of the photosensitive unit 802.

A thickness of the photosensitive layer 8021 is greater than that of the first active layer 8011, so that the thickness of the photosensitive unit 8021 is greater than that of conventional active layers, which is conducive to increasing the current generated by the photosensitive unit 802 receiving the light of the second wavelength.

A ratio of the thickness of the photosensitive layer 8021 to the thickness of the first active layer 8011 is greater than or equal to 1.5 and less than or equal to 10. For example, the ratio is 2, 3, 4, 5, 6, 7, 8, or 9.

Specifically, a fabrication material of the photosensitive layer 8021 includes amorphous silicon (α-Si). The thickness of the photosensitive layer 8021 is greater than or equal to 1000 angstroms and less than or equal to 3500 angstroms.

The array layer 80 further includes a light-transmissive protective layer 813. At least part of the light-transmissive protective layer 813 is formed in the via hole 80*a* and located on the photosensitive layer 8021, so as to protect the photosensitive layer 8021 and also ensure light transmittance of the light-transmissive protective layer 813, so that more light of the second wavelength passes through the light-transmissive protective layer 813 to be received by the photosensitive layer 8021.

Specifically, the light-transmissive protective layer 813 covers the photosensitive layer 8021 to protect the entire photosensitive layer 8021.

The transmittance of the light-transmissive protective layer 813 to the light of the second wavelength is greater than or equal to 80%. For example, the transmittance of the light-transmissive protective layer 813 to the light of the second wavelength is 85%, 85%, 90%, or 95%.

Specifically, a fabrication material of the light-transmissive protective layer 813 is indium tin oxide. A thickness of the light-transmissive protective layer 813 is greater than or equal to 400 angstroms and less than or equal to 800 angstroms.

It should be noted that transmittance of the indium tin oxide layer to the light of the second wavelength is greater than transmittance of the insulating layer in the array layer 80 to the light of the second wavelength. The light-transmissive protective layer 813 made of indium tin oxide is beneficial for more light of the second wavelength to pass through the light-transmissive protective layer 813 to be received by the photosensitive layer 8021.

As shown in FIG. 6, the light-emitting substrate 202 shown in FIG. 6 is basically similar to the light-emitting substrate shown in FIG. 5. Differences are that the array layer 80 is provided with another passivation layer 812 between the second planarization layer 811 and the first planarization layer 809, and the photosensitive layer 8021 is only formed in the via hole 80*a*, and the thickness of the photosensitive layer 8021 is less than a depth of the via hole 80*a*.

The thickness of the photosensitive layer 8021 of the light-emitting substrate 202 shown in FIG. 6 is greater than or equal to the thickness of the interlayer dielectric layer 807 and less than a sum of the thickness of the interlayer dielectric layer 807 and the thickness of the first planarization layer 809, which is more beneficial to increase the current generated by the photosensitive unit 802 receiving the light of the second wavelength.

Figure 7:
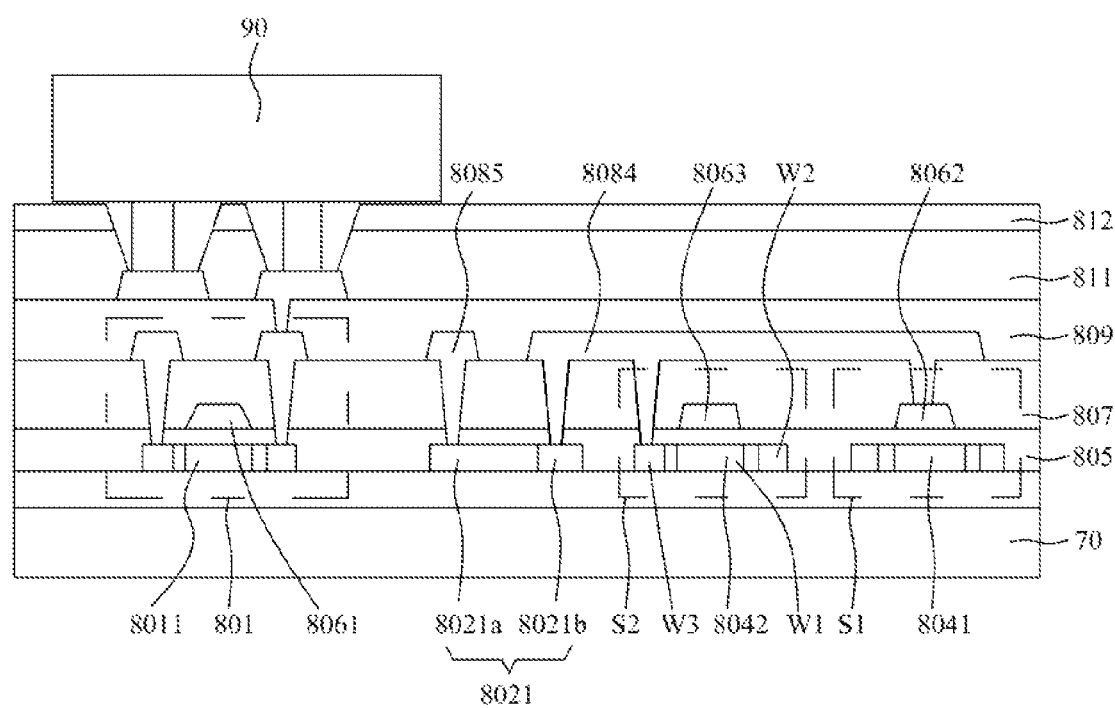
FIG. 7 is a schematic partially enlarged view of a third type of light-emitting substrate of FIG. 3.

Please refer to FIG. 7. The light-emitting substrate shown in FIG. 7 is similar to the light-emitting substrate shown in FIG. 5, and the similarities will not be repeated. Differences include:

The array layer 80 does not include the via hole 80*a* and the light-transmissive protective layer 813.

The first active layer 8011 of the switch unit 801 is disposed in a same layer as the photosensitive layer 8021, that is, the semiconductor layer of the array layer 80 further includes the photosensitive layer 8021. The photosensitive layer 8021 includes an undoped portion 8021*a* and a heavily doped portion 8021*b* connected to the undoped portion 8021*a*.

The semiconductor layer of the array layer 80 further includes a third active layer 8042, which also includes a channel W1, a heavily doped source portion W2, a heavily doped drain portion W3, a lightly doped source portion W4, and a lightly doped drain portion W5. The first metal layer of the array layer 80 further includes a third gate electrode 8063 disposed corresponding to the channel W1 of the third active layer 8042.

The second metal layer of the array layer 80 further includes a bridging line 8084 and a signal transmission line 8085. The signal transmission line 8085 is in contact with the undoped part 8021*a* of the photosensitive layer 8021 through a fifth contact hole extending through the interlayer dielectric layer 807 and the gate insulating layer 805. The bridging line 8084 is in contact with the heavily doped portion 8021*b* of the photosensitive layer 8021 through a sixth contact hole extending through the interlayer dielectric layer 807 and the gate insulating layer 805. In addition, the bridging line 8084 is in contact with the heavily doped drain portion W3 of the third active layer 8042 through a seventh contact hole extending through the interlayer dielectric layer 807 and the gate insulating layer 805. Further, the bridging line 8084 is in contact with the second gate electrode 8062 through an eighth contact hole extending through the interlayer dielectric layer 807.

It should be noted that the third active layer 8042 and the third gate 8063 form part of a reset switch S2. The reset switch S2 is electrically connected to the photosensitive unit 802 through the bridging line 8084 and is configured to reset a potential of the heavily doped portion 8021*b* of the photosensitive layer 8021 through the bridging line 8084.

The bridging line 8084 is in contact with the second gate 8062 through the eighth contact hole extending through the interlayer dielectric layer 807, so that the second gate 8062 of the signal reading switch S1 is connected to the photosensitive layer 8021, and the current generated by the photosensitive unit 802 receiving the light of the second wavelength controls the second gate 8062 to control the signal reading switch S1 to be turned on and off.

The descriptions of the above embodiments are only used to help understand the technical solutions and core ideas of this application; those of ordinary skill in the art should understand that: they can still modify the technical solutions described in the foregoing embodiments, or equivalently replace some of the technical features; and these modifications or replacements do not divorce the essence of the corresponding technical solutions The scope of the technical solution of each embodiment of the present application.

What is claimed is:

1. A backlight module, comprising a light-emitting substrate, wherein the light-emitting substrate comprises:
   a substrate;

an array layer disposed on the substrate and comprising a plurality of photosensitive units and switch units; and a plurality of light-emitting chips disposed on a side of the array layer away from the substrate and staggered from the photosensitive units, wherein the light-emitting chips are electrically connected to at least one of the switch units;

wherein the photosensitive units are configured to sense light of a first wavelength, and the light-emitting substrate further comprises: a selective light transmission layer disposed on the side of the array layer away from the substrate and between the light-emitting chips, wherein the selective light transmission layer overlaps the photosensitive unit, allows for transmission of light of a second wavelength, and blocks light other than the light of the second wavelength, wherein the second wavelength is in a band corresponding to the first wavelength.

2. The backlight module of claim 1, wherein the light of the second wavelength is infrared light, and the light of the first wavelength comprises ultraviolet light, visible light, and infrared light.

3. The backlight module of claim 2, wherein the selective light transmission layer is an ink layer.

4. The backlight module of claim 3, wherein the ink layer is a white ink layer or a black ink layer.

5. The backlight module of claim 3, wherein a thickness of the selective light transmission layer is greater than or equal to 10 microns and less than or equal to 100 microns.

6. The backlight module of claim 1, wherein at least some of the photosensitive units are disposed between adjacent ones of the light-emitting chips.

7. The backlight module of claim 1, wherein the array layer further comprises:
a plurality of film layers disposed in a stacked manner; and
a via hole extending through at least part of the film layers in a thickness direction of the light-emitting substrate;
wherein each of the photosensitive units comprises a photosensitive layer, and at least part of the photosensitive layer is disposed at a bottom of the via hole.

8. The backlight module of claim 7, wherein each of the switch units comprises a first active layer, and a thickness of the photosensitive layer is greater than that of the first active layer.

9. The backlight module of claim 8, wherein a ratio of the thickness of the photosensitive layer to the thickness of the first active layer is greater than or equal to 1.5 and less than or equal to 10, and the thickness of the photosensitive layer is greater than or equal to 1000 angstroms and less than or equal to 3500 angstroms.

10. The backlight module of claim 7, wherein the array layer further comprises:
a light-transmissive protective layer, wherein at least part of the light-transmissive protective layer is arranged in the via hole and located on the photosensitive layer.

11. The backlight module of claim 10, wherein light transmittance of the light-transmissive protective layer is greater than or equal to 80%, and the light-transmissive protective layer is made of indium tin oxide.

12. The backlight module of claim 7, wherein the array layer further comprises a signal reading switch electrically connected to the photosensitive unit.

13. The backlight module of claim 12, wherein the signal reading switch comprises:
a second active layer comprising a channel, a heavily doped source portion, and a heavily doped drain portion, wherein the heavily doped source portion and the heavily doped drain portion are located at opposite sides of the channel, respectively; and
a conductive electrode in contact with one of the heavily doped source portion or the heavily doped drain portion;
wherein the via hole is disposed corresponding to the other one of the heavily doped source portion or the heavily doped drain portion; and
the photosensitive layer is in contact with the other one of the heavily doped source portion or the heavily doped drain portion through the via hole.

14. The backlight module of claim 1, wherein each of the photosensitive units comprises a photosensitive layer, and each of the switch units comprises a first active layer disposed in a same layer as the photosensitive layer.

15. The backlight module of claim 14, wherein the array layer further comprises a signal reading switch having a gate connected to the photosensitive layer.

16. The backlight module of claim 15, wherein the array layer further comprises a reset switch electrically connected to the photosensitive unit.

17. The backlight module of claim 16, wherein the signal reading switch comprises a second active layer, and the reset switch comprises a third active layer, wherein the second active layer and the third active layer are arranged in a same layer as the first active layer;
wherein the array layer further comprises a bridging line connected to the photosensitive layer, the third active layer, and the gate of the signal reading switch.

18. A backlight module, comprising a light-emitting substrate, wherein the light-emitting substrate comprises:
a substrate;
an array layer disposed on the substrate and comprising a plurality of photosensitive units and switch units; and
a plurality of light-emitting chips disposed on a side of the array layer away from the substrate and staggered from the photosensitive units, wherein the light-emitting chips are electrically connected to at least one of the switch units; wherein
the array layer further comprises:
a plurality of film layers disposed in a stacked manner; and
a via hole extending through at least part of the film layers in a thickness direction of the light-emitting substrate;
wherein each of the photosensitive units comprises a photosensitive layer, and at least part of the photosensitive layer is disposed at a bottom of the via hole;
wherein the photosensitive layer is located in the via hole and extends to a surface of one of the film layers located furthest from the substrate relative to others of the film layers.

19. A display device, comprising a backlight module and a liquid crystal display panel disposed on a light exit side of the backlight module, and the backlight module comprising a light-emitting substrate, wherein the light-emitting substrate comprises:
a substrate;
an array layer disposed on the substrate and comprising a plurality of photosensitive units and switch units; and
a plurality of light-emitting chips disposed on a side of the array layer away from the substrate and staggered from the photosensitive units, wherein the light-emitting chips are electrically connected to at least one of the switch units;
wherein the photosensitive units are configured to sense light of a first wavelength, and the light-emitting substrate further comprises: a selective light transmission layer disposed on the side of the array layer away from the substrate and between the light-emitting chips, wherein the selective light transmission layer overlaps the photosensitive unit, allows for transmission of light of a second wavelength, and blocks light other than the light of the second wavelength, wherein the second wavelength is in a band corresponding to the first wavelength.

20. The display device of claim 19, wherein the light of the second wavelength is infrared light, and the light of the first wavelength comprises ultraviolet light, visible light, and infrared light.

\* \* \* \* \*